(12) United States Patent
Aoki

(10) Patent No.: US 9,012,350 B2
(45) Date of Patent: Apr. 21, 2015

(54) CATALYST FOR EXHAUST GAS PURIFICATION, AND METHOD FOR MANUFACTURING SAME

(71) Applicant: Toyota Jidosha Kabushiki Kaisha, Toyota-shi, Aichi (JP)

(72) Inventor: Yuki Aoki, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/985,894

(22) PCT Filed: Oct. 22, 2012

(86) PCT No.: PCT/JP2012/077264
§ 371 (c)(1),
(2) Date: Aug. 16, 2013

(87) PCT Pub. No.: WO2013/061933
PCT Pub. Date: May 2, 2013

(65) Prior Publication Data
US 2014/0228209 A1    Aug. 14, 2014

(30) Foreign Application Priority Data

Oct. 26, 2011  (JP) ................................ 2011-235359

(51) Int. Cl.
*B01J 23/00*  (2006.01)
*B01J 23/02*  (2006.01)
(Continued)

(52) U.S. Cl.
CPC ............... *B01J 23/63* (2013.01); *B01D 53/865* (2013.01); *F01N 3/2828* (2013.01); *B01D 2255/1023* (2013.01); *B01D 2255/2042* (2013.01);
(Continued)

(58) Field of Classification Search
CPC ............ B01J 23/02; B01J 23/10; B01J 23/44; B01J 23/58; B01J 23/63; B01J 21/04; B01J 21/066; B01J 37/04; B01J 37/08
USPC ................ 502/304, 327, 328, 333, 339, 341, 502/349–351, 355, 415, 439
See application file for complete search history.

(56) References Cited

U.S. PATENT DOCUMENTS 6,261,989 B1 *  7/2001  Tanaka et al. ................. 502/217
6,464,946 B1 * 10/2002  Yamada et al. ............... 422/177
(Continued)

FOREIGN PATENT DOCUMENTS

JP    3-106446    5/1991
JP    8-215568    8/1996
(Continued)

*Primary Examiner* — Cam N. Nguyen
(74) *Attorney, Agent, or Firm* — Finnegan, Henderson, Farabow, Garrett & Dunner, LLP

(57) ABSTRACT

The herein disclosed exhaust gas purification catalyst is an exhaust gas purification catalyst that is provided with a porous carrier 40 and palladium 50 supported on this porous carrier 40. The porous carrier 40 is provided with an alumina carrier 42 formed of alumina and with a CZ carrier 44 formed of a ceria-zirconia complex oxide. Barium is added to both the alumina carrier 42 and the CZ carrier 44. Here, an amount of barium added to the alumina carrier 42 is an amount that corresponds to 10 mass % to 15 mass % relative to a total mass of the alumina carrier 42 excluding the barium, and an amount of barium added to the CZ carrier 44 is an amount that corresponds to 5 mass % to 10 mass % relative to a total mass of the CZ carrier 44 excluding the barium.

6 Claims, 8 Drawing Sheets

(51) Int. Cl.

| | | |
|---|---|---|
| *B01J 23/06* | (2006.01) | |
| *B01J 23/08* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 20/00* | (2006.01) | |
| *B01J 21/04* | (2006.01) | |
| *B01J 23/63* | (2006.01) | |
| *B01D 53/86* | (2006.01) | |
| *F01N 3/28* | (2006.01) | |
| *B01J 35/04* | (2006.01) | |

(52) U.S. Cl.
CPC .................. *B01D2255/2065* (2013.01); *B01D 2255/20715* (2013.01); *B01D 2255/2092* (2013.01); *B01J 35/04* (2013.01)

(56) References Cited

U.S. PATENT DOCUMENTS

| | | | |
|---|---|---|---|
| 6,797,668 B2 * | 9/2004 | Yoshikawa | 502/304 |
| 6,831,036 B1 * | 12/2004 | Yamazaki et al. | 502/327 |
| 6,864,214 B2 * | 3/2005 | Uenishi et al. | 502/304 |
| 6,881,384 B1 * | 4/2005 | Uenishi et al. | 422/177 |
| 6,930,068 B2 * | 8/2005 | Kaneko et al. | 502/101 |
| 7,081,430 B2 * | 7/2006 | Uenishi et al. | 502/327 |
| 7,473,665 B2 * | 1/2009 | Kawai et al. | 502/217 |
| 7,601,670 B2 * | 10/2009 | Yasuda et al. | 502/326 |
| 8,367,578 B2 * | 2/2013 | Collier et al. | 502/304 |
| 2005/0176580 A1 * | 8/2005 | Osaka et al. | 502/339 |
| 2008/0269046 A1 | 10/2008 | Minoshima et al. | |

FOREIGN PATENT DOCUMENTS

| | | |
|---|---|---|
| JP | 9-215924 | 8/1997 |
| JP | 2008-290065 | 12/2008 |
| JP | 2009-273988 | 11/2009 |
| WO | WO 2011/089500 A2 | 7/2011 |

* cited by examiner

CATALYST FOR EXHAUST GAS PURIFICATION, AND METHOD FOR MANUFACTURING SAME

TECHNICAL FIELD

The present invention relates to an exhaust gas purification catalyst that purifies the exhaust gas output from an internal combustion engine and further relates to a method for manufacturing this catalyst.

This application is a national phase application of International Application No. PCT/JP2012/077264, filed Oct. 22, 2012, and claims the priority of Japanese Application No. 2011-235359, filed Oct. 26, 2011, the content of both of which is incorporated herein by reference.

BACKGROUND ART

So-called three-way catalysts are widely used to purify the hydrocarbon (HC), carbon monoxide (CO), and nitrogen oxides (NOx) present in the exhaust gas output by automotive internal combustion engines. Three-way catalysts are generally able to efficiently purify these three exhaust gas components by oxidation•reduction only when the air/fuel ratio is near the theoretical air/fuel ratio (stoichiometry), and their catalytic activity drops off drastically when the air/fuel ratio is outside the range in the neighborhood of stoichiometry. As a result, the co-use of an oxygen storage material, typified by ceria ($CeO_2$), as a catalyst promoter has been widely practiced in order to broaden the air/fuel ratio range at which the catalyst can exhibit activity. In addition, the use of a ceria-zirconia complex oxide—provided by making ceria and zirconia ($ZrO_2$) into a complex oxide—as a catalyst promoter in place of poorly heat-resistant ceria is also widely practiced in order to improve the heat-resistance properties of the catalyst.

The noble metal catalysts used in three-way catalysts are, for example, platinum (Pt), palladium (Pd), and rhodium (Rh). Among these noble metals, Pd and Pt contribute mainly to the purification function (oxidative purification capacity) for carbon monoxide (CO) and hydrocarbon (HC), while Rh contributes mainly to the purification function (reductive purification capacity) for NOx. In order to bring out the best catalytic activity for these noble metal catalysts with their different properties, porous carriers that are optimal for the individual noble metal catalysts must be sought. Porous carriers that use alumina in combination with a ceria-zirconia complex oxide (for example, Patent Literature 1) have heretofore been widely used as porous carriers for supporting Pd, which is one of the noble metal catalysts. These porous carriers are useful because they can combine the large specific surface area and high durability (particularly heat resistance) possessed by alumina with the oxygen storage/release function possessed by the ceria-zirconia complex oxide.

CITATION LIST

Patent Literature

Patent Literature 1: Japanese Patent Application Laid-open No. 2008-290065

SUMMARY OF INVENTION

The exhaust gas resides in a low-temperature state immediately after an engine, for example, in an automobile, is started. As a consequence, the problem of a reduced purification capacity for hydrocarbon (HC) arises when exhaust gas purification is carried out using Pd. That is, during the low-temperature interval immediately after engine start, a portion of the hydrocarbon remains unpurified and this residual hydrocarbon adsorbs to the surface of the palladium and forms a coating on the surface of the Pd particles, which depletes the active sites. The purification capacity of the catalyst ultimately undergoes a decline as a result. Thus, an inhibition of the occurrence of HC poisoning is desired in the case of exhaust gas purification using Pd.

The present invention was pursued considering this point and has as its main object the introduction of an exhaust gas purification catalyst that is resistant to the HC poisoning of palladium and that has an enhanced low-temperature catalytic activity.

With regard to Pd catalysts in which the carrier is both alumina and a ceria-zirconia complex oxide, the inventor for the present application realized that HC poisoning of the Pd could be suppressed by the addition of barium (Ba) to each carrier and further discovered that the HC poisoning of Pd could be effectively inhibited by using different amounts of Ba addition for each carrier. The present invention was achieved based on this discovery.

That is, the exhaust gas purification catalyst provided by the present invention is an exhaust gas purification catalyst that has a porous carrier and palladium supported on this porous carrier. This porous carrier is provided with an alumina carrier formed of alumina and with a CZ carrier formed of a ceria-zirconia complex oxide. Barium (Ba) is added to both the alumina carrier and the CZ carrier. In addition, an amount of barium that has been added to the alumina carrier is an amount that corresponds to 10 mass % to 15 mass % relative to a total mass of the alumina carrier excluding the barium, and the amount of barium that has been added to the CZ carrier is 5 mass % to 10 mass % relative to a total mass of the CZ carrier excluding the barium.

By doing this, the occurrence of HC poisoning (particularly olefin poisoning) of the palladium can be suppressed to a greater degree than with conventional exhaust gas purification catalysts that lack barium or that have a quantity of barium addition that does not satisfy the ranges given above. As a consequence, HC poisoning of the palladium is effectively suppressed even directly after engine start and a high catalytic activity (particularly the low-temperature activity) can be exhibited. The cause of this is thought to be as follows: due to an interaction between the palladium noble metal catalyst and the barium added to the alumina carrier and the CZ carrier, the valence of the palladium is held down and the desorption reaction of the HC adsorbed to the palladium is promoted.

In addition, the dispersion of the palladium over each carrier is improved through the addition of an optimal amount of barium to the alumina carrier and CZ carrier in the exhaust gas purification catalyst with the herein described structure. This results in a better inhibition of grain growth by the palladium at high temperatures (sintering) and the durability of the catalyst can be improved as a result. Accordingly, the present invention can provide an exhaust gas purification catalyst that exhibits a better inhibition of HC poisoning of the palladium, a better inhibition of sintering of the palladium, and thus a better purification performance than has heretofore been available.

The content of the barium in the alumina carrier is an amount that corresponds to 10 mass % to 15 mass % (for example, more than 10 mass % and not more than 15 mass %) relative to the total mass of the alumina carrier excluding the barium. When the barium content is much above 15 mass % or much below 10 mass %, the improvement in catalytic performance due to the addition of the barium will not be satisfactory and a high purification performance may not be obtained. The content of the barium in the CZ carrier is an amount that corresponds to 5 mass % to 10 mass % relative to the total mass of the CZ carrier excluding the barium. Setting the barium content in this range can provide a better inhibition of HC poisoning of the palladium and can cause the appearance of a high catalytic activity even immediately after engine start. In addition, a better inhibition of palladium sintering is obtained and the durability of the palladium is thus improved.

The amount of barium present in the alumina carrier is preferably larger than the amount of barium present in the CZ carrier. HC poisoning of the palladium and palladium sintering can be effectively inhibited by suitable adjustment in this manner of the amount of barium in the alumina carrier and in the CZ carrier. A better catalyst performance can be reliably exhibited as a result.

In a preferred embodiment of the herein disclosed exhaust gas purification catalyst, the mass mixing ratio (alumina carrier:CZ carrier) between the alumina carrier (excluding barium) and the CZ carrier (excluding barium) is in the range from 80:20 to 20:80. Because the ratio between the alumina carrier and CZ carrier resides in a favorable balance when this composition is used, the effects due to the co-use of the alumina carrier with the CZ carrier (for example, the effect of enabling the combination of the large specific surface area and high durability (particularly heat resistance) possessed by the alumina carrier with the oxygen storage/release behavior possessed by the CZ carrier) can be favorably exhibited. When the mixing ratio for the CZ carrier is too low, the oxygen storage/release performance for the carrier as a whole may decline; on the other hand, it is undesirable for the mixing ratio for the alumina carrier to be too low since this results in a decline in the specific surface area that impairs the ability to support the desired amount of palladium.

In a preferred embodiment of the herein disclosed exhaust gas purification catalyst, the supported amount of palladium that is supported on the alumina carrier is an amount that corresponds to 0.1 mass % to 3 mass % (preferably from at least 0.1 mass % to not more than 1.5 mass %) relative to the total mass of the alumina carrier without the barium. A palladium loading rate in the indicated range is desirable because a satisfactory catalytic effect by the palladium is then obtained while avoiding an excessive overhead from a cost standpoint.

In a preferred embodiment of the herein disclosed exhaust gas purification catalyst, the supported amount of the palladium supported on the CZ carrier is an amount that corresponds to 0.1 mass % to 3 mass % (preferably from at least 0.1 mass % to not more than 1.5 mass %) relative to the total mass of the CZ carrier without the barium. A palladium loading rate in the indicated range is desirable because a satisfactory catalytic effect by the palladium is then obtained while avoiding an excessive overhead from a cost standpoint.

The present invention also provides a method for favorably manufacturing the exhaust gas purification catalyst described in the preceding. That is, this is a method for manufacturing an exhaust gas purification catalyst that is provided with a porous carrier and with palladium supported on this porous carrier. This method encompasses the preparation of an alumina carrier formed of alumina, a CZ carrier formed of a ceria-zirconia complex oxide, and a barium-containing solution that contains barium and a solvent. It further encompasses supporting palladium on this alumina carrier and this CZ carrier. It further encompasses adding the barium-containing solution to both the alumina carrier and the CZ carrier and performing calcination. It further encompasses mixing the barium-containing alumina carrier with the barium-containing CZ carrier. The barium-containing solution added here to the alumina carrier and the CZ carrier is prepared such that an amount of barium added to the alumina carrier is an amount corresponding to 10 mass % to 15 mass % relative to a total mass of the alumina carrier excluding the barium and an amount of barium added to the CZ carrier is an amount corresponding to 5 mass % to 10 mass % relative to a total mass of the CZ carrier excluding the barium. This manufacturing method enables the advantageous production of an exhaust gas purification catalyst in which barium has been added in an appropriate amount to both the alumina carrier and the CZ carrier.

In a preferred embodiment of the herein disclosed method for manufacturing the exhaust gas purification catalyst, an aqueous barium solution provided by dissolving a water-soluble barium salt in water is used as the barium-containing solution. This addition in the form of a solution of a barium salt dissolved in water provides a more uniform dispersion (highly disperse) of the barium in the individual carriers than for an addition in particulate form. As a consequence, an exhaust gas purification catalyst can be manufactured that exhibits an excellent purification performance with an even better expression of the barium addition-induced improvement in catalytic performance (inhibition of HC poisoning and inhibition of sintering).

DESCRIPTION OF EMBODIMENTS

Advantageous embodiments of the present invention are described in the following with reference to the figures. Matters (e.g., general matters in relation to the position of the exhaust gas purification catalyst in an automobile) required for the execution of the invention, but not included in the matters particularly described in this Description (for example, the composition of the porous carrier), can be understood as design matters for the individual skilled in the art based on the conventional art in the pertinent field. The present invention can be implemented based on the contents of this Description and the common general technical knowledge in the pertinent field.

The herein disclosed exhaust gas purification catalyst may take the form of a powder or pellet constituted of the above-described carrier and noble metal (oxidation catalyst metal) supported on this carrier, however, when disposed in the exhaust system of an internal combustion engine, e.g., in the engine of a vehicle, a suitable substrate is typically provided.

This substrate can have the various shapes and can use the various materials heretofore used in this type of service. For example, a honeycomb substrate having a honeycomb structure formed from a highly heat-resistant ceramic, e.g., cordierite or silicon carbide (SiC), or an alloy (e.g., stainless steel), can be favorably used. One example is a honeycomb substrate that has a cylindrical outer shape, that is provided with penetrating holes (cells) in its axial direction that function as exhaust gas flow passages, and that is configured so that the exhaust gas can come into contact with the partition walls (rib walls) of each cell. In addition to a honeycomb shape, the substrate may assume a foam shape or a pellet shape. Instead of a cylindrical shape, the outer shape of the substrate as a whole may be an elliptical shape or a polyhedral shape.

Figure 1:
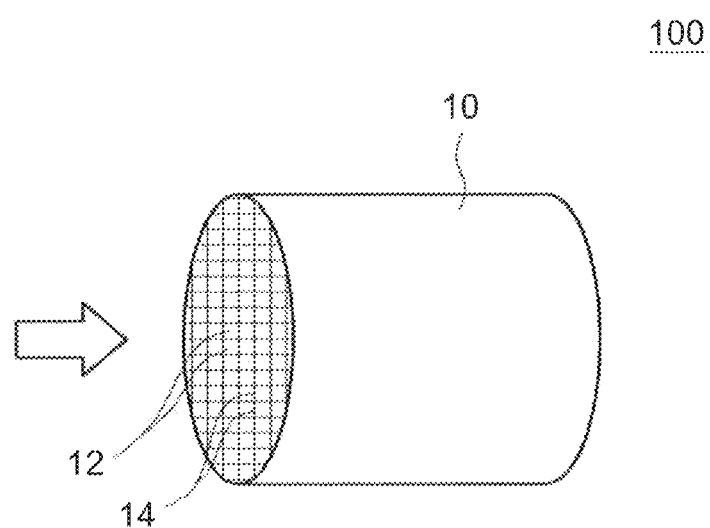
FIG. 1 is a schematic descriptive structural diagram of an exhaust gas purification catalyst according to an embodiment of the present invention.

FIG. 1 is a schematic diagram that shows the structure of an exhaust gas purification catalyst according to an embodiment. As shown in FIG. 1, the exhaust gas purification catalyst 100 according to this embodiment has a honeycomb substrate 10, a plurality of cells 12 disposed in a regular arrangement, and rib walls 14 that form the cells 12.

The various materials heretofore used in this type of service can be used without particular limitation as the material of the substrate. For example, a honeycomb substrate provided with a honeycomb structure formed from a ceramic, e.g., cordierite or silicon carbide (SiC), or an alloy (e.g., stainless steel), can be favorably used. An example here is a honeycomb substrate that has a cylindrical outer shape, that is provided with cells (penetrating holes) in its axial direction that function as exhaust gas flow passages, and that is configured so that the exhaust gas can come into contact with the partitioning rib walls (partitions) of each cell. In addition to a honeycomb shape, the substrate may assume a foam shape or a pellet shape. In addition, instead of a cylindrical shape, the outer shape of the substrate as a whole may be an elliptical shape or a polyhedral shape.

Figure 2:
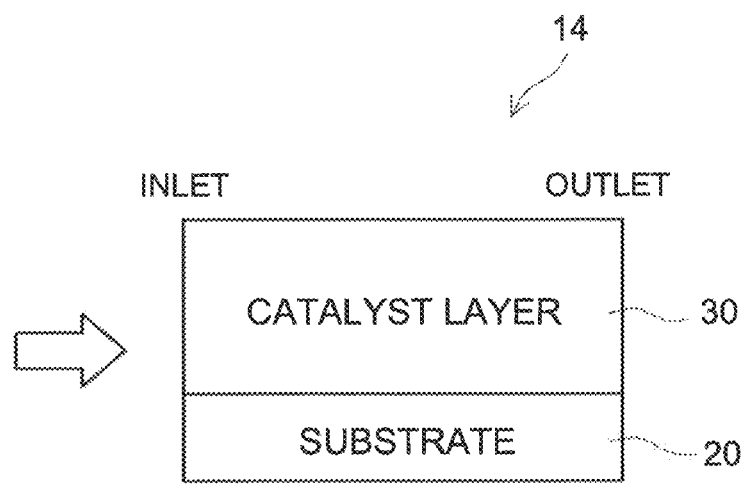
FIG. 2 is a diagram that schematically illustrates the structure of the rib wall part in an exhaust gas purification catalyst according to an embodiment of the present invention.

FIG. 2 is a diagram that schematically shows the structure of the surface region of the rib wall 14 in the honeycomb substrate 10 in FIG. 1. The exhaust gas purification catalyst 100 is provided with a substrate 20 (this corresponds to the rib wall 14 described above) and a catalyst layer 30 formed on this substrate 20. The catalyst layer 30 may be formed uniformly over the entire body as shown in FIG. 2 and may be formed into a two-layer structure and specifically into a two-layer structure comprising a lower layer part (underlayer part) in proximity to the surface of the substrate 20 and an upper layer part (surface layer part) that is a layer relatively farther from the surface of the substrate 20. In the following, the material constituting the catalyst layer is described in detail based on a catalyst layer 30 with a single layer structure.

Figure 3:
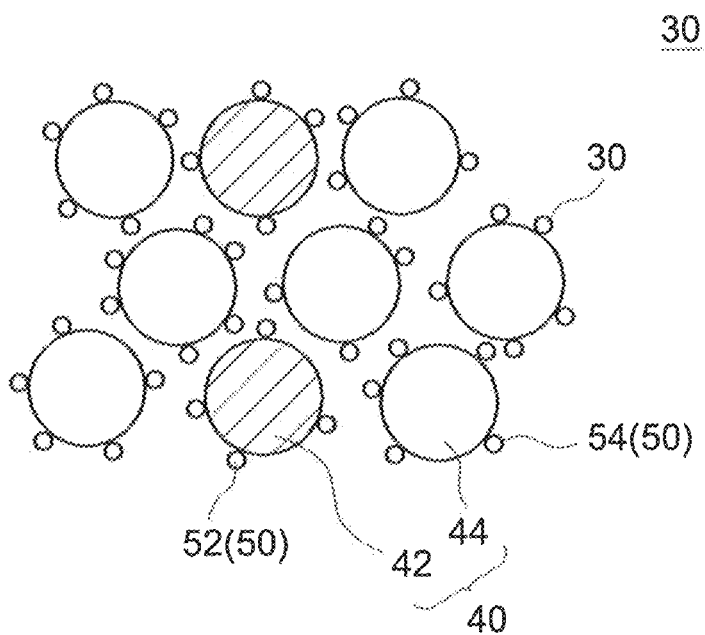
FIG. 3 is a diagram that schematically illustrates main parts of a catalyst layer according to an embodiment of the present invention.

As shown in FIG. 3, the catalyst layer 30 of the herein disclosed exhaust gas purification catalyst 100 is constituted of a porous carrier 40 and palladium 50, which is typically supported in a microparticulate form of the noble metal on the porous carrier 40. The porous carrier 40 encompasses an alumina carrier 42 comprising alumina and a CZ carrier 44 comprising a ceria-zirconia complex oxide. Barium (Ba) has been added to the alumina carrier 42 and the CZ carrier 44 in the herein disclosed art. In addition, the amount of barium that has been added to the alumina carrier 42 is an amount corresponding to 10 mass % to 15 mass % relative to the total mass of the alumina carrier 42 excluding the barium, and the amount of barium that has been added to the CZ carrier 44 is an amount corresponding to 5 mass % to 10 mass % relative to the total mass of the CZ carrier 44 excluding the barium.

By doing this, the occurrence of HC poisoning (particularly olefin poisoning) of the palladium can be suppressed to a greater degree than with conventional exhaust gas purification catalysts that lack barium or that have a quantity of barium addition that does not satisfy the ranges given above. As a consequence, HC poisoning of the palladium is effectively suppressed even directly after engine start and a high catalytic activity (particularly the low-temperature activity) can be exhibited.

The cause of this is thought to be as follows: due to an interaction between the palladium 50 that is the noble metal catalyst and the barium added to the alumina carrier 42 and the CZ carrier 44, the valence of the palladium 50 is held down at low temperatures and the desorption reaction of the HC adsorbed to the palladium 50 is promoted. In addition, the dispersion of the palladium 50 over each of the carriers 42, 44 is improved through the addition of an optimal amount of barium to the alumina carrier 42 and CZ carrier 44 in the exhaust gas purification catalyst with this structure. This results in a better inhibition of grain growth (sintering) by the palladium 50 at high temperatures and the durability of the catalyst can then be improved. Accordingly, the construction described in the preceding can provide an exhaust gas purification catalyst that exhibits a better inhibition of HC poisoning of the palladium 50, a better inhibition of sintering of the palladium 50, and thus a better purification performance than heretofore available.

<The Alumina Carrier>

An alumina carrier 42 is incorporated in the porous carrier 40 constituting the herein disclosed exhaust gas purification catalyst 100. This alumina carrier 42 is composed mainly of alumina as described above. Here, "composed mainly" is a term that encompasses a carrier composed only of alumina, or, in the event of the incorporation of another compound that is used as a carrier for an exhaust gas purification catalyst in this type of application, a carrier in which a fraction exceeding 50% of its volume (or mass) (for example, 70 to 80% or more) is composed of alumina.

That is, the alumina carrier 42 comprising the herein disclosed exhaust gas purification catalyst 100 may incorporate another compound (typically an inorganic oxide) as a secondary component. For example, a rare-earth element, e.g., lanthanum, an alkaline-earth metal element, e.g., calcium, or a transition metal element may be used for such a compound. Among these, a rare-earth element such as lanthanum is favorably used as a stabilizer from the standpoint of improving the specific surface area at high temperatures without poisoning the catalytic function. A particularly preferred alumina carrier is composed of a high alumina content carrier in which the proportion (mass ratio) of these secondary components is 3% to 30% of the carrier as a whole (for example, a lanthanum content of approximately 4%).

The shape (external shape) of the alumina carrier 42 is not particularly limited, although the use of a powder form (particulate form) is preferred from the standpoint of being able to secure a larger specific surface area. The average particle diameter (the average particle diameter as measured by laser diffraction•scattering. This also applies in the following unless specifically indicated otherwise.) of the particles comprising the alumina carrier 42 is preferably from at least 1 nm to not more than 10 nm and more preferably from at least 1 nm to not more than 3 nm. The specific surface area of the particles comprising this carrier (the specific surface area measured by the BET method; this also applies in the following) is preferably from at least 50 m$^2$/g to not more than 150 m$^2$/g and is more preferably from at least 80 m²/g to not more than 120 m²/g. An average particle diameter for the particles constituting this carrier that is too large or a specific surface area that is too small is undesirable because of a declining dispersity by the noble metal supported on the carrier then appears and the purification performance of the catalyst then declines. In addition, a particle size for the particles constituting this carrier that is too small or a specific surface area that is too large is undesirable because the heat resistance of the carrier itself then declines and the heat-resistance characteristics of the catalyst decline as a result.

<The Barium>

Barium is present added to the alumina carrier 42. The addition of barium to the alumina carrier 42 results in an inhibition of HC poisoning of the palladium 52 supported on the alumina carrier 42 and thereby improves the catalytic activity (particularly the low-temperature activity). In addition, it can bring about an improvement in the durability of the catalyst by improving the dispersity of the palladium 52 over the alumina carrier 42 and providing a better suppression of the sintering accompanying grain growth of the palladium 52 at high temperatures.

The herein disclosed alumina carrier 42 has an amount of barium addition that preferably satisfies 10 mass % to 15 mass % and particularly preferably 12 mass % to 15 mass % relative to the total mass of the alumina carrier excluding the barium. By having the barium content be in the indicated range, a better inhibition of HC poisoning of the palladium 52 at low temperatures is brought about, which results in the appearance of a high catalytic activity even immediately after engine start. In addition, a better inhibition of sintering of the palladium 52 is obtained, which provides for an improved durability by the palladium 52. When the barium content is too much above 15 mass % or too much below 10 mass %, the improvement in catalytic performance due to this addition of barium will not be satisfactory and a high purification performance may not be obtained.

This alumina carrier 42 to which barium has been added can be manufactured, for example, as described in the following. First, an aqueous barium solution is prepared by dissolving a water-soluble barium salt (for example, barium acetate) in water. This aqueous barium solution is added to the alumina carrier 42 with stirring and drying is then carried out. The barium can be incorporated in the alumina carrier 42 by holding the obtained powder for a prescribed period of time at elevated temperatures (for example, approximately 400° C. to 600° C.). Adding the barium in this manner in the form of a solution produced by dissolution in water provides a more uniform dispersion of the barium in the alumina carrier 42 than does addition in particulate form. As a consequence, an exhaust gas purification catalyst can be obtained that has a high purification capacity with a better manifestation of the barium addition-induced improvement in catalytic performance (inhibition of HC poisoning and inhibition of sintering). This barium addition may be carried out prior to supporting the palladium 52 on the alumina carrier 42 or after supporting the palladium 52 on the alumina carrier 42, but is more preferably carried out after the palladium 52 has been supported on the alumina carrier 42. This enables a more reliable manifestation of the effects cited above.

<The Palladium>

The palladium 52 used in the herein disclosed exhaust gas purification catalyst 100 is present supported on the barium-containing alumina carrier 42. The alumina carrier 42 has a smaller specific surface area and a higher durability (particularly heat resistance) than the CZ carrier 44. As a consequence, by supporting the palladium 52 on the alumina carrier 42, the thermal stability of the carrier as a whole can be improved and the palladium can be supported in an optimal amount on the carrier as a whole.

The supported amount of the palladium 52 that is supported on the alumina carrier 42 is suitably an amount that corresponds to 0.1 mass % to 3 mass % relative to the total mass of the alumina carrier 42 without the barium, and is preferably 0.1 mass % to 1.5 mass %. When the supported amount of palladium 52 is too small, the catalytic activity provided by the palladium 52 is inadequate; when, on the other hand, the supported amount is too large, this is disadvantageous from a cost standpoint while at the same time also facilitating the occurrence of grain growth by the palladium 52.

There are no particular limitations on the method for supporting the palladium 52 on the alumina carrier 42. Preparation can be carried out, for example, by impregnating the alumina carrier 42 with an aqueous solution that contains a palladium salt (for example, the nitrate) or a palladium complex (for example, a tetraamine complex) followed by drying and calcination.

<The CZ Carrier>

In addition to the previously described alumina carrier 42, a CZ carrier 44 is present in the porous carrier 40 comprising the herein disclosed exhaust gas purification catalyst 100. This CZ carrier 44 is composed mainly of a complex oxide between ceria and zirconia. Here, "composed mainly" is a term that encompasses a carrier composed only of a ceria-zirconia complex oxide, or, in the event of the incorporation of another compound that is used as a carrier for an exhaust gas purification catalyst in this type of application, a carrier in which a fraction exceeding 50% of its volume (or mass) (for example, 70 to 80% or more) is composed of a ceria-zirconia complex oxide.

That is, the CZ carrier 44 comprising the herein disclosed exhaust gas purification catalyst 100 may incorporate another compound (typically an inorganic oxide) as a secondary component. For example, a rare-earth element, e.g., lanthanum and yttrium, an alkaline-earth metal element, e.g., calcium, or a transition metal element may be used for such a compound. Among these, a rare-earth element such as lanthanum and yttrium is favorably used as a stabilizer from the standpoint of improving the specific surface area at high temperatures without poisoning the catalytic function. A particularly preferred CZ carrier is composed of a carrier having a high content of ceria-zirconia complex oxide, in which the proportion (mass ratio) of these secondary components is 3% to 30% of the carrier as a whole (for example, a content of lanthanum and yttrium of 5% each).

The shape (external shape) of the CZ carrier 44 is not particularly limited, but the use of a powder form (particulate form) is advantageous from the standpoint of being able to secure a larger specific surface area. The average particle diameter of the particles comprising the CZ carrier 44 is preferably from at least 5 nm to not more than 20 nm and is more preferably from at least 7 nm to not more than 12 nm. The specific surface area of the particles making up this carrier (the specific surface area measured by the BET method; this also applies in the following) is preferably from at least 20 m²/g to not more than 80 m²/g and more preferably from at least 40 m²/g to not more than 60 m²/g. An average particle diameter for the particles constituting this carrier that is too large or a specific surface area that is too small is undesirable because a trend of a declining dispersity by the noble metal supported on the carrier then appears and the purification performance of the catalyst declines. In addition, a particle size for the particles constituting this carrier that is too small or a specific surface area that is too large is undesirable because the heat resistance of the carrier itself then declines and the heat-resistance characteristics of the catalyst decline as a result.

<The Barium>

Barium is present added to the CZ carrier 44. The addition of barium to the CZ carrier 44 results in an inhibition of HC poisoning of the palladium 54 supported on the CZ carrier 44 and thereby improves the catalytic activity (particularly the low-temperature activity). In addition, it can bring about an improvement in the durability of the catalyst by improving the dispersity of the palladium 54 over the CZ carrier 44 and providing a better suppression of the sintering associated with grain growth of the palladium 54 at high temperatures.

The herein disclosed CZ carrier 44 has an amount of barium addition that preferably satisfies 5 mass % to 10 mass % and particularly preferably 5 mass % to 8 mass % relative to the total mass of the CZ carrier excluding the barium. By having the barium content be in the indicated range, a better inhibition of HC poisoning of the palladium 54 at low temperatures is brought about, which results in the appearance of a high catalytic activity even immediately after engine start. In addition, a better inhibition of sintering of the palladium 54 is obtained, which provides for an improved durability by the palladium 54. When the barium content is much above 10 mass % or much below 5 mass %, the improvement in catalytic performance due to this addition of the barium will not be satisfactory and a high purification performance may not be obtained.

This CZ carrier 44 to which barium has been added can be manufactured, for example, as described in the following. First, an aqueous barium solution is prepared by dissolving a water-soluble barium salt (for example, barium acetate) in water. This aqueous barium solution is added to the CZ carrier 44 with stirring and drying is then carried out. The barium can be incorporated in the CZ carrier 44 by holding the obtained powder for a prescribed period of time at elevated temperatures (for example, approximately 400° C. to 600° C.). Adding the barium salt in this manner in the form of a solution produced by dissolution in water provides a more uniform dispersion of the barium in the CZ carrier 44 than for addition in particulate form. As a consequence, an exhaust gas purification catalyst can be obtained that has a high purification capacity with a better manifestation of the barium addition-induced improvement in catalytic performance (inhibition of HC poisoning and inhibition of sintering). This barium addition may be carried out prior to supporting the palladium 54 on the CZ carrier 44 or after supporting the palladium 54 on the CZ carrier 44, but is more preferably carried out after the palladium 54 has been supported on the CZ carrier 44. This enables a more reliable manifestation of the effects cited above.

<The Palladium>

The palladium 54 used in the herein disclosed exhaust gas purification catalyst 100 is present supported on the barium-containing CZ carrier 44. When this construction is used, the oxygen storage/release capacity (OSC) of the CZ carrier 44 enables the exhaust gas purification catalyst 100 to exhibit a purification capacity that is stable with respect to variations in the components in the exhaust gas. That is, the exhaust gas atmosphere in an automobile engine varies to the rich side or lean side depending on the operating conditions for the automobile. The CZ carrier 44 is a material that has an oxygen storage/release capacity, and a catalyst that contains such an oxygen storage/release material can store oxygen when the oxygen concentration in the exhaust gas is high and can release oxygen when the oxygen concentration in the exhaust gas is low. Because of this, variations in the oxygen concentration in the exhaust gas are smoothed out and the exhaust purification capacity of the three-way catalyst can be raised.

The supported amount of palladium 54 that is supported on the CZ carrier 44 is suitably an amount that corresponds to 0.1 mass % to 3 mass % relative to the total mass of the CZ carrier 44 without the barium, and is preferably 0.1 mass % to 1.5 mass %. When the supported amount of the palladium 54 is too small, the catalytic activity provided by the palladium 54 is inadequate; when, on the other hand, the supported amount is too large, this is disadvantageous from a cost standpoint while at the same time also facilitating the occurrence of grain growth by the palladium 54.

The palladium 54 can be supported on the CZ carrier 44 by the same method as used to support the palladium on the previously described alumina carrier 42. Preparation can be carried out, for example, by impregnating the CZ carrier 44 with an aqueous solution that contains a palladium salt (for example, the nitrate) or a palladium complex (for example, a tetramine complex) followed by drying and calcination.

<Mixing of the Alumina Carrier and the CZ Carrier>

The porous carrier 40 used in the herein disclosed exhaust gas purification catalyst 100 is obtained by simply mixing the alumina carrier 42 on which the palladium 52 has been supported with the CZ carrier 44 on which the palladium 54 has been supported. This mixing of the alumina carrier 42 with the CZ carrier 44 can be performed, for example, by a physical mixing with an automated mortar. Here, the alumina carrier 42 and the CZ carrier 44 are preferably mixed at a mass mixing ratio in the barium-free state (alumina carrier:CZ carrier) in the range from 80:20 to 20:80. Because the ratio between the palladium 52-loaded alumina carrier 42 and the palladium 54-loaded CZ carrier 44 resides in a favorable balance when this composition is used, the effects due to the co-use of the alumina carrier 42 with the CZ carrier 44 (for example, the effect of enabling the combination of the large specific surface area and high durability (particularly heat resistance) possessed by the alumina carrier 42 with the oxygen storage/release behavior possessed by the CZ carrier 44) can be favorably exhibited. When the mixing ratio for the CZ carrier 44 is too low, the oxygen storage/release performance for the carrier as a whole may exhibit a declining trend; on the other hand, it is undesirable for the mixing ratio for the alumina carrier 42 to be too low since this results in a decline in the thermal stability of the carrier as a whole and in a decline in the specific surface area that impairs the ability to support the desired amount of palladium.

Components other than the alumina carrier 42 and CZ carrier 44 may be mixed into the porous carrier 40 as long as the total mass of the alumina carrier 42+CZ carrier 44 mixture is at least 50 mass % relative to the overall porous carrier 40. For example, a single element or a plurality of elements or a single oxide or a plurality of oxides selected from, e.g., the alkaline-earth metal elements (or alkaline-earth metal oxides), the rare-earth elements (or rare-earth oxides), silica, titania, ceria, and zirconia can be mixed in the porous carrier 40 in order, for example, to increase the mechanical strength, improve the durability (thermal stability), inhibit catalyst sintering, and inhibit poisoning of the catalyst.

The following matters are included in the herein disclosed art: a method of manufacturing an exhaust gas purification catalyst 100 that is provided with a porous carrier 40 and palladium 50 supported on the porous carrier 40, comprising:

preparing an alumina carrier 42 that comprises alumina, a CZ carrier 44 that comprises a ceria-zirconia complex oxide, and a barium-containing solution that contains barium and a solvent;

supporting palladium 50 on the prepared alumina carrier 42 and CZ carrier 44; and adding the barium-containing solution to the alumina carrier 42 and CZ carrier 44 on which the palladium 50 has been supported and performing calcination.

The barium-containing solution added here to the alumina carrier 42 and the CZ carrier 44 is configured to provide an amount of barium addition to the alumina carrier 42 that is an amount corresponding to 10 mass % to 15 mass % relative to the total mass of the alumina carrier 42 excluding the barium and to provide an amount of barium addition to the CZ carrier 44 that is an amount corresponding to 5 mass % to 10 mass % relative to the total mass of the CZ carrier 44 excluding the barium.

This manufacturing method can advantageously produce an exhaust gas purification catalyst 100 in which barium has been added in optimal amounts to both the alumina carrier 42 and the CZ carrier 44. In a preferred embodiment, an aqueous barium solution of a water-soluble barium salt (for example, barium acetate) dissolved in water is used as the aforementioned barium-containing solution. The barium is uniformly dispersed (highly dispersed) in the carriers 42, 44 when this construction is used. As a consequence, an exhaust gas purification catalyst can be produced that has an excellent purification capacity with a better manifestation of the barium addition-induced improvement in catalytic performance (inhibition of HC poisoning and inhibition of sintering).

Test examples are described in the following. However, the present invention is not limited to these test examples.

[The Ba-Containing Alumina Carrier]

Example 1

An alumina powder composed of 96 wt % $Al_2O_3$ and 4 wt % $La_2O_3$ was used as the alumina carrier. 100 mass parts of the alumina powder was impregnated with a nitric acid-type Pd reagent solution sufficient to provide 0.5 mass parts palladium (Pd), followed by drying for 30 minutes at a temperature of 120° C. and then calcination by standing for 2 hours at a temperature of 500° C. to produce a Pd/alumina powder. In addition, an aqueous barium solution was prepared by dissolving barium acetate in water. The aqueous barium solution was added to 100 mass parts of the produced Pd/alumina powder so as to provide 5 mass parts of the barium, followed by drying for 30 minutes at a temperature of 120° C. and then calcination for 2 hours at a temperature of 500° C. The Example 1 catalyst sample was prepared by applying a load of approximately 1 ton to the obtained catalyst powder using a cold isostatic press (CIP) and molding pellets having a volume of approximately 1 $mm^3$.

Example 2

Example 1 was followed with the exception that the aqueous barium solution was added to 100 mass parts of the Pd/alumina powder so as to provide 10 mass parts barium (Ba), and pellets were molded to give the Example 2 catalyst sample.

Example 3

Example 1 was followed with the exception that the aqueous barium solution was added to 100 mass parts of the Pd/alumina powder so as to provide 15 mass parts barium (Ba), and pellets were molded to give the Example 3 catalyst sample.

Example 4

Example 1 was followed with the exception that the aqueous barium solution was added to 100 mass parts of the Pd/alumina powder so as to provide 22 mass parts barium (Ba), and pellets were molded to give the Example 4 catalyst sample.

Example 5

The Example 5 catalyst sample was prepared by molding pellets having a volume of approximately 1 $mm^3$ using a CIP from a Pd/alumina powder produced as in Example 1 (i.e., the Pd/alumina powder to which barium had not been added).

[The Ba-Containing CZ Carrier]

Example 6

A CZ powder composed of 30 wt % $CeO_3$, 60 wt % $ZrO_3$, 5 wt % $La_2O_3$, and 5 wt % $Y_2O_3$ was used as the CZ carrier. 100 mass parts of the CZ powder was impregnated with a nitric acid-type Pd reagent solution sufficient to provide 0.5 mass parts palladium (Pd), followed by drying for 30 minutes at a temperature of 120° C. and then calcination by standing for 2 hours at a temperature of 500° C. to produce a Pd/CZ powder. In addition, an aqueous barium solution was prepared by dissolving barium acetate in water. The aqueous barium solution was added to 100 mass parts of the produced Pd/CZ powder so as to provide 5 mass parts of the barium, followed by drying for 30 minutes at a temperature of 120° C. and then calcination for 2 hours at a temperature of 500° C. The Example 6 catalyst sample was prepared by applying a load of approximately 1 ton to the obtained catalyst powder using a cold isostatic press and molding pellets having a volume of approximately 1 $mm^3$.

Example 7

Example 6 was followed with the exception that the aqueous barium solution was added to 100 mass parts of the Pd/CZ powder so as to provide 10 mass parts barium (Ba), and pellets were molded to give the Example 7 catalyst sample.

Example 8

Example 6 was followed with the exception that the aqueous barium solution was added to 100 mass parts of the Pd/CZ powder so as to provide 15 mass parts barium (Ba), and pellets were molded to give the Example 8 catalyst sample.

Example 9

Example 6 was followed with the exception that the aqueous barium solution was added to 100 mass parts of the Pd/CZ powder so as to provide 22 mass parts barium (Ba), and pellets were molded to give the Example 9 catalyst sample.

Example 10

The Example 10 catalyst sample was prepared by molding pellets having a volume of approximately 1 $mm^3$ using a CIP from a Pd/CZ powder produced as in Example 6 (i.e., the Pd/CZ powder to which barium had not been added).

[Durability Testing]

Durability testing was carried out on each of the samples from Examples 1 to 10 using an annular reactor. The durability test was performed by repetitively executing an alternating flow for 5 hours on a 5-minute cycle of a gas containing 2 volume % carbon monoxide (CO) (balance gas is nitrogen) and a gas containing 1 volume % oxygen ($O_2$) (balance gas is nitrogen), while holding the sample at 1100° C.

[Measurement Test for the 50% Purification Temperature]

Figure 4:
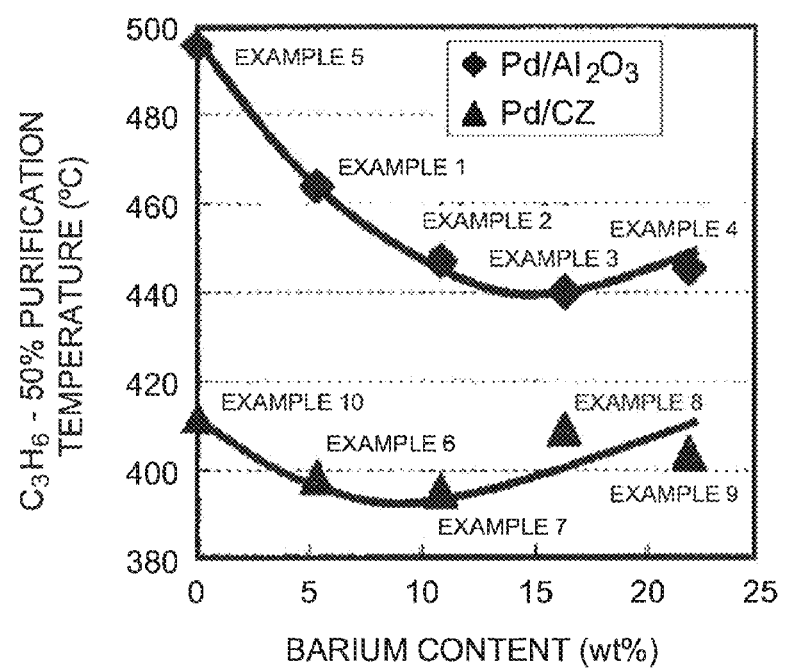
FIG. 4 is a graph that shows the relationship between Ba content and the 50% propylene purification temperature.
Figure 5:
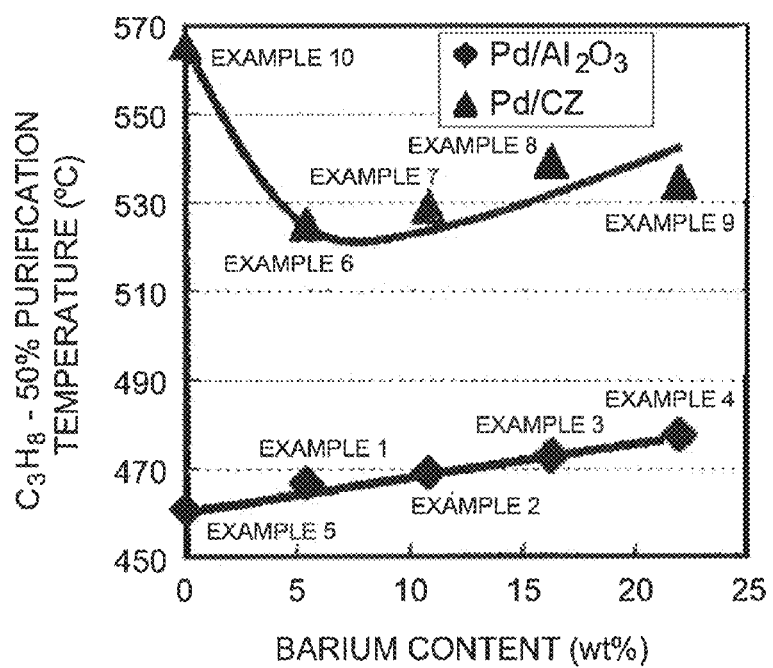
FIG. 5 is a graph that shows the relationship between Ba content and the 50% propane purification temperature.

The 50% purification temperature was measured on each of the samples from Examples 1 to 10 after the durability test; this was done using the gas conditions in Table 1 and continuously measuring the purification rate for the HC gas during a temperature ramp up from 100° C. to 600° C. (rate of temperature rise=20° C./minute). Here, the 50% purification temperature is the gas temperature at the catalyst inlet when the purification rate for the HC gas reaches 50%. In order to investigate the inhibitory effect on olefin poisoning, two types of HC gases, i.e., propylene ($C_3H_6$) and propane ($C_3H_8$), were used and compared. The results are given in FIGS. 4 and 5. FIG. 4 is a graph that shows the relationship between the barium content and the 50% purification temperature for the use of propylene, while FIG. 5 is a graph that shows the relationship between the barium content and the 50% purification temperature for the use of propane.

TABLE 1

| type of gas | gas concentration (composition) | |
| --- | --- | --- |
| | propylene | propane |
| HC | 3000 ppm | 5000 ppm |
| CO | 0.4% | 1% |
| $NO_x$ | 3300 ppm | 5000 ppm |
| $O_2$ | 0.45% | 5% |
| $CO_2$ | 14.45% | 20% |
| water addition | 3% | 3% |
| $N_2$ | balance | balance |

As is clear from FIG. 4, the 50% purification temperature for propylene exceeded 490° C. in the case of the catalyst sample according to Example 5, which had a barium content in the alumina carrier of 0 (zero). In contrast to this, the catalyst samples according to Examples 1 to 4, in which barium had been added to the alumina carrier, gave a lower 50% purification temperature for propylene than in Example 5 and thus had a better low-temperature catalytic activity. In particular, a very low 50% purification temperature, of not more than 450° C., was achieved by having the barium content in the alumina carrier be 10 mass % to 15 mass % (Examples 2 and 3). Thus, when viewed from the standpoint of improving the low-temperature catalytic activity, the barium content in the alumina carrier is desirably made 10 mass % to 15 mass %.

The situation with the CZ carrier is the same as for the alumina carrier. That is, the 50% purification temperature for propylene exceeded 410° C. in the case of the catalyst sample according to Example 10, in which the barium content in the CZ carrier was 0 (zero). In contrast to this, the catalyst samples according to Examples 6 to 9, in which barium had been added to the CZ carrier, gave a lower 50% purification temperature for propylene than in Example 10 and thus had a better low-temperature catalytic activity. In particular, a very low 50% purification temperature, of not more than 400° C., was achieved by having the barium content in the CZ carrier be 5 mass % to 10 mass % (Examples 6 and 7). Thus, when viewed from the standpoint of improving the low-temperature catalytic activity, the barium content in the CZ carrier is desirably made 5 mass % to 10 mass %.

As shown in FIG. 5, when propane was used as the HC gas, the catalyst samples according to Examples 6 to 9, in which barium was added to the CZ carrier, provided a lower 50% purification temperature for propane than in Example 10 and thus had a better low-temperature catalytic activity. In contrast to this, the catalyst samples according to Examples 1 to 4, in which barium was added to the alumina carrier, had a higher 50% purification temperature than in Example 5 and thus presented a deficient low-temperature catalytic activity. This demonstrated that the improvement in the low-temperature catalytic activity brought about by the addition of barium to the alumina carrier was particularly effectively displayed in the case of the purification of lower olefins such as propylene.

[The Degree of Pd Dispersion]

The amount of CO (carbon monoxide) adsorption was measured by the CO pulse method on the catalyst samples of Examples 1 to 10 and the degree of Pd dispersion was then calculated. Here, the degree of Pd dispersion is the ratio of the number B of Pd atoms exposed at the surface of the Pd particles to the total number A of Pd atoms in the catalyst and is calculated using degree of Pd dispersion (%)=(B/A)×100. Here, the total number A of Pd atoms in the catalyst is calculated based on the total mass of the Pd supported on the carrier. The number B of Pd atoms exposed at the surface of the Pd particles is calculated from the amount of CO adsorbed in the CO pulse method based on the assumption of a 1:1 adsorption between the CO and the Pd atoms exposed at the Pd particle surface. The results are given in FIG. 6.

Figure 6:
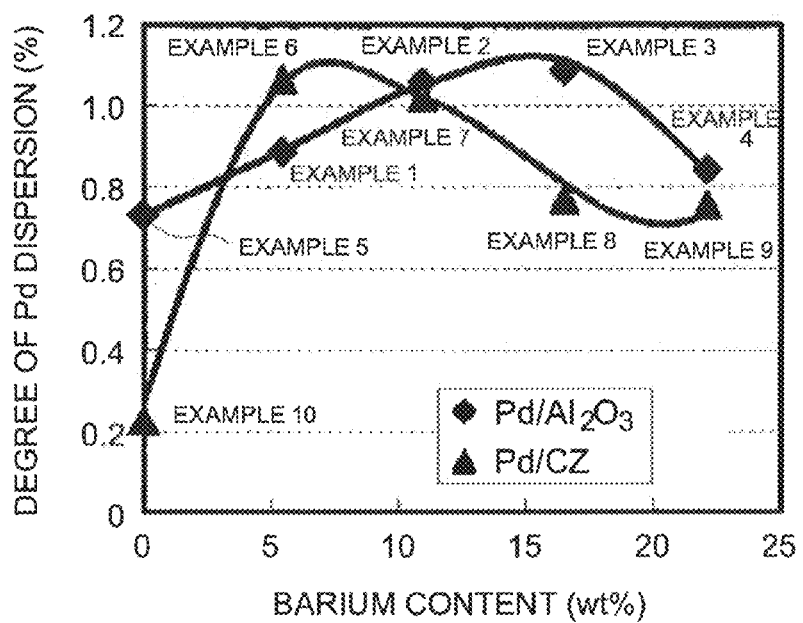
FIG. 6 is a graph that shows the relationship between Ba content and the degree of Pd dispersion.

As is clear from FIG. 6, the degree of Pd dispersion was not more than 0.8% in the case of the catalyst sample according to Example 5, in which the barium content in the alumina carrier was 0 (zero). In contrast to this, the catalyst samples according to Examples 1 to 4, in which barium had been added to the alumina carrier, had a higher degree of Pd dispersion than in Example 5 and thus had a better dispersity (and therefore a better resistance to sintering by the Pd). In particular, a very high degree of Pd dispersion of 1.0% or more (Examples 2 and 3) could be achieved by having the barium content in the alumina carrier be 10 mass % to 15 mass %. Thus, viewed from the standpoint of improving the resistance to sintering, the barium content in the alumina carrier is desirably made 10 mass % to 15 mass %.

The situation with the CZ carrier is the same as for the alumina carrier. That is, the degree of Pd dispersion was not more than 0.25% in the case of the catalyst sample according to Example 10, in which the barium content in the CZ carrier was 0 (zero). In contrast to this, the catalyst samples according to Examples 6 to 9, in which barium had been added to the CZ carrier, gave a higher degree of Pd dispersion than in Example 10 and thus had a better dispersity (and therefore a better resistance to sintering by the Pd). In particular, a very high degree of Pd dispersion of 1.0% or more was achieved by having the barium content in the CZ carrier be 5 mass % to 10 mass % (Examples 6 and 7). Thus, when viewed from the standpoint of improving the sintering resistance, the barium content in the CZ carrier is desirably made 5 mass % to 10 mass %.

The following tests were then performed in order to investigate the influence on catalytic performance due to differences in the mode of addition of the barium to the alumina carrier and CZ carrier.

Example 11

A Pd/alumina powder was prepared as in Example 1. Barium was added directly in its granular form to this Pd/alumina powder. Specifically, a barium-containing solution was prepared in which a granular barium sulfate was dispersed in water. The barium-containing solution was added to 100 mass parts of the Pd/alumina powder prepared as described above so as to provide 5 mass parts barium (Ba), followed by drying for 30 minutes at a temperature of 120° C. and then calcination for 2 hours at a temperature of 500° C. The Example 11 catalyst sample was prepared by applying a load of approximately 1 ton to the obtained catalyst powder using a cold isostatic press and molding pellets having a volume of approximately 1 mm$^3$.

Example 12

A Pd/CZ powder was prepared as in Example 6. Barium was added directly in its granular form to this Pd/CZ powder. Specifically, a barium-containing solution was prepared in which barium sulfate was dispersed in water. The barium-containing solution was added to 100 mass parts of the Pd/CZ powder prepared as described above so as to provide 5 mass parts barium (Ba), followed by drying for 30 minutes at a temperature of 120° C. and then calcination for 2 hours at a temperature of 500° C. The Example 12 catalyst sample was prepared by applying a load of approximately 1 ton to the obtained catalyst powder using a cold isostatic press and molding pellets having a volume of approximately 1 mm$^3$.

Figure 7:
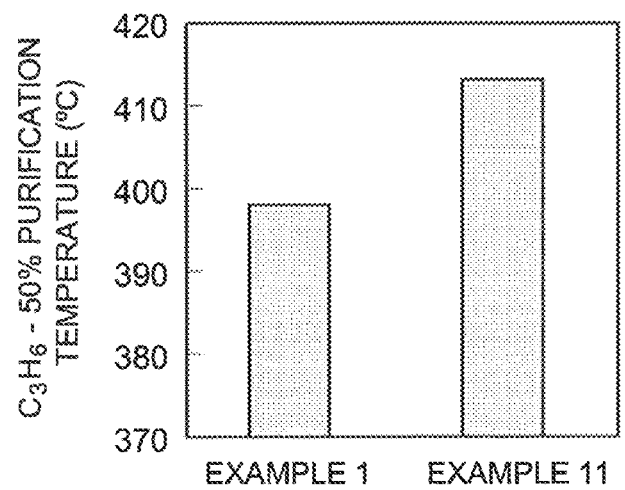
FIG. 7 is a graph that shows the 50% propylene purification temperature of the catalyst samples according to Example 1 and Example 11.
Figure 8:
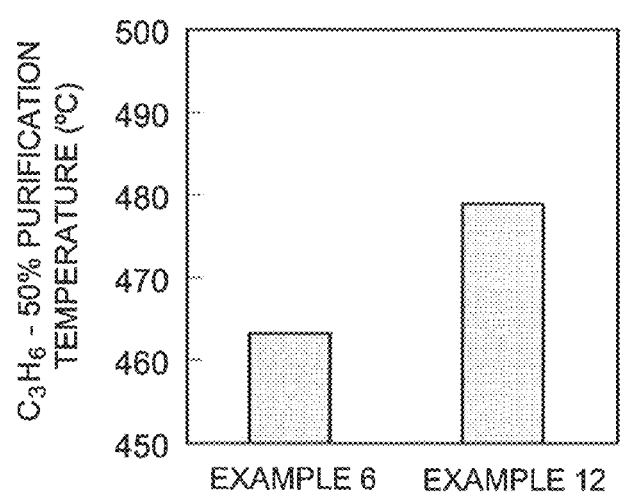
FIG. 8 is a graph that shows the 50% propylene purification temperature of the catalyst samples according to Example 6 and Example 12.

The properties of the catalyst samples of Example 11 and Example 12 were evaluated by carrying out durability testing and 50% purification temperature measurement testing as for Examples 1 to 10. The results for Example 11 are shown in FIG. 7 along with the results for Example 1. The results for Example 12 are shown in FIG. 8 along with the results for Example 6.

As shown in FIG. 7, the catalyst sample according to Example 11, in which the barium was added in particulate form to the alumina carrier, had a higher 50% purification temperature than the Example 1 catalyst sample, in which the barium was added in the form of a solution provided by dissolution in water, and thus presented a deficient low-temperature catalytic activity. The situation is the same with the CZ carrier as for the alumina carrier. As shown in FIG. 8, the catalyst sample according to Example 12, in which the barium was added in particulate form to the CZ carrier, had a higher 50% purification temperature than the Example 6 catalyst sample, in which the barium was added in the form of a solution provided by dissolution in water, and thus presented a deficient low-temperature catalytic activity. The preceding is thought to be due to the following: the addition of the barium dissolved in water results in a higher dispersity for the Ba and thus a more effective development of the inhibitory effect on HC poisoning.

Based on the preceding results, it was possible to optimize the amount of barium added to the alumina carrier in accordance with these test examples. The amount of barium added to the CZ carrier could also be optimized. As a consequence, an exhaust gas purification catalyst having an optimal composition as a whole can be realized in accordance with the present constitution.

The present invention has been described in detail in the preceding, but the hereinabove described embodiments and working examples are nothing more than examples and the herein disclosed invention encompasses various modifications and alterations of the specific examples provided above.

INDUSTRIAL APPLICABILITY

The present invention provides an exhaust gas purification catalyst that resists the occurrence of HC poisoning of palladium and that thus exhibits a higher low-temperature catalytic activity.

The invention claimed is:

1. An exhaust gas purification catalyst comprising palladium supported on a porous carrier, wherein
the porous carrier comprises an alumina carrier formed of alumina and a CZ carrier formed of a ceria-zirconia complex oxide;
barium is added to both the alumina carrier and the CZ carrier;
an amount of barium added to the alumina carrier is an amount that corresponds to 10 mass % to 15 mass % relative to a total mass of the alumina carrier excluding the barium; and
an amount of barium added to the CZ carrier is an amount that corresponds to 5 mass % to 10 mass % relative to a total mass of the CZ carrier excluding the barium.

2. The exhaust gas purification catalyst according to claim 1, wherein a mass mixing ratio (alumina carrier:CZ carrier) between the alumina carrier (excluding the barium) and the CZ carrier (excluding the barium) is in a range from 80:20 to 20:80.

3. The exhaust gas purification catalyst according to claim 1, wherein a supported amount of palladium supported on the alumina carrier is an amount that corresponds to 0.1 mass % to 3 mass % relative to a total mass of the alumina carrier without the barium.

4. The exhaust gas purification catalyst according to claim 1, wherein a supported amount of palladium supported on the CZ carrier is an amount that corresponds to 0.1 mass % to 3 mass % relative to a total mass of the CZ carrier without the barium.

5. A method of manufacturing an exhaust gas purification catalyst comprising palladium supported on a porous carrier, the method comprising:
preparing an alumina carrier formed of alumina, a CZ carrier formed of a ceria-zirconia complex oxide, and a barium-containing solution that contains barium and a solvent;
supporting palladium on the alumina carrier and on the CZ carrier;
adding the barium-containing solution to the alumina carrier and to the CZ carrier to form a barium-containing alumina carrier and a barium-containing CZ carrier and performing calcination; and
mixing the barium-containing alumina carrier with the barium-containing CZ carrier, wherein
the barium-containing solution added to the alumina carrier and the CZ carrier is prepared such that an amount of barium added to the alumina carrier is an amount corresponding to 10 mass % to 15 mass % relative to a total mass of the alumina carrier excluding the barium, and an amount of barium added to the CZ carrier is an amount corresponding to 5 mass % to 10 mass % relative to a total mass of the CZ carrier excluding the barium.

6. The method of manufacturing according to claim 5, wherein the barium-containing solution is prepared from an aqueous barium solution in which a water-soluble barium salt is dissolved in water.

* * * * *